United States Patent
Hagiwara

(10) Patent No.: US 10,286,727 B2
(45) Date of Patent: May 14, 2019

(54) METHOD FOR PRODUCING WHEEL-SUPPORTING ROLLER BEARING UNIT

(71) Applicant: NSK Ltd., Tokyo (JP)

(72) Inventor: Nobuyuki Hagiwara, Kanagawa (JP)

(73) Assignee: NSK Ltd., Tokyo (JP)

( * ) Notice: Subject to any disclaimer, the term of this patent is extended or adjusted under 35 U.S.C. 154(b) by 386 days.

(21) Appl. No.: 15/029,937

(22) PCT Filed: Oct. 1, 2014

(86) PCT No.: PCT/JP2014/005021
§ 371 (c)(1),
(2) Date: Apr. 15, 2016

(87) PCT Pub. No.: WO2015/056413
PCT Pub. Date: Apr. 23, 2015

(65) Prior Publication Data
US 2016/0263940 A1 Sep. 15, 2016

(30) Foreign Application Priority Data

Oct. 17, 2013 (JP) .................................. 2013-216425

(51) Int. Cl.
*B21K 25/00* (2006.01)
*B60B 27/00* (2006.01)
(Continued)

(52) U.S. Cl.
CPC .......... *B60B 27/0084* (2013.01); *B21D 53/10* (2013.01); *B21D 53/12* (2013.01);
(Continued)

(58) Field of Classification Search
CPC . B60B 27/0084; B60B 27/0005; B60B 27/00; F16C 43/04; F16C 43/065;
(Continued)

(56) References Cited

U.S. PATENT DOCUMENTS

| 6,363,799 B1* | 4/2002 | Toda | B60B 27/00 384/448 |
|---|---|---|---|
| 2003/0185479 A1* | 10/2003 | Toda | B60B 27/00 384/544 |
| 2012/0119686 A1* | 5/2012 | Bertotto | H02P 21/22 318/400.02 |

FOREIGN PATENT DOCUMENTS

| CN | 102151783 A | * | 8/2011 |
|---|---|---|---|
| EP | 2 284 021 A1 | | 2/2011 |

(Continued)

OTHER PUBLICATIONS

European Search Report issued in counterpart European Application No. 14854303.6 dated Jul. 6, 2017 (nine pages).

(Continued)

*Primary Examiner* — Sarang Afzali
*Assistant Examiner* — Ruth G Hidalgo-Hernandez
(74) *Attorney, Agent, or Firm* — Crowell Moring LLP

(57) ABSTRACT

There is provided a method capable of producing a wheel-supporting rolling bearing unit at low cost. In an event of producing a wheel-supporting rolling bearing unit, a cylindrical portion formed in an axial end portion of a hub ring is inserted through an inner ring, swing caulking is performed by pressing a die against a tip end portion of the cylindrical portion protruding to an axial end portion side more than the inner ring and an axial end surface of the inner ring is held by a caulked portion formed by caulking and expanding the tip end portion of the cylindrical portion radially outward. In such a way, the inner ring and the hub ring are fixed integrally witch each other. At this time, a swing angle of the swing caulking is set at 15 degrees or more to 30 degrees or less.

15 Claims, 7 Drawing Sheets

(51) Int. Cl.
- *B21D 53/12* (2006.01)
- *B21J 9/02* (2006.01)
- *F16C 19/18* (2006.01)
- *B21D 53/10* (2006.01)
- *F16C 43/06* (2006.01)
- *F16C 43/04* (2006.01)

(52) U.S. Cl.
CPC ............... *B21J 9/025* (2013.01); *B21K 25/00* (2013.01); *B60B 27/00* (2013.01); *B60B 27/0005* (2013.01); *F16C 19/186* (2013.01); *F16C 43/04* (2013.01); *F16C 43/065* (2013.01); *F16C 2226/52* (2013.01); *F16C 2326/02* (2013.01); *Y10T 29/49636* (2015.01)

(58) Field of Classification Search
CPC .......................... F16C 19/186; F16C 2226/52; F16C 2326/02; B21D 53/10; B21D 53/12; B21J 9/025; B21K 25/00; Y10T 29/497
See application file for complete search history.

(56) References Cited

FOREIGN PATENT DOCUMENTS

| | | |
|---|---|---|
| JP | 8-47741 A | 2/1996 |
| JP | 2002-303332 A | 10/2002 |
| JP | 2003-275832 A | 9/2003 |
| JP | 2004-162913 A | 6/2004 |
| JP | 2005-36905 A | 2/2005 |
| JP | 2006-116550 A | 5/2006 |
| JP | 4337301 B2 | 9/2009 |
| JP | 2013-772 A | 1/2013 |

OTHER PUBLICATIONS

International Search Report (PCT/ISA/210) issued in PCT Application No. PCT/JP2014/005021 dated Nov. 18, 2014, with English translation (four (4) pages).

Japanese-language Written Opinion (PCT/ISA/237) issued in PCT Application No. PCT/JP2014/005021 dated Nov. 18, 2014 (four (4) pages).

Chinese Office Action issued in counterpart Chinese Application No. 201480050547.0 dated Jul. 24, 2017 with unverified English translation (11 pages).

Japanese Office Action issued in counterpart Japanese Application No. 2013-216425 dated Jul. 25, 2017 with unverified English translation (eight pages).

International Preliminary Report on Patentability (PCT/IB/338 & PCT/IB/373) issued in PCT Application No. PCT/JP2014/005021 dated Apr. 28, 2016, including English translation of document C2 (Japanese-language Written Opinion (PCT/ISA/237)) previously filed on Apr. 15, 2016 (nine (9) pages).

\* cited by examiner

METHOD FOR PRODUCING WHEEL-SUPPORTING ROLLER BEARING UNIT

TECHNICAL FIELD

The present invention relates to a method for producing a wheel-supporting rolling bearing unit that supports a wheel of an automobile or the like rotatably with respect to a suspension device.

BACKGROUND ART

A wheel-supporting rolling bearing unit that supports a wheel of an automobile or the like rotatably with respect to a suspension device includes: an inner member having plural lines of raceway surfaces on an outer circumferential surface thereof; an outer member having plural lines of raceway surfaces on an inner circumferential surface thereof; and plural rolling elements disposed between the raceway surfaces of the inner member and the raceway surfaces of the outer member so as to be rotatable. Then, the inner member is supported rotatably to the outer member via the rolling of the rolling elements. Moreover, a flange for attaching the wheel thereto is provided on the outer circumferential surface of the inner member, and in addition, a flange for attaching the suspension device thereto is provided on an outer circumferential surface of the outer member.

In such a conventional wheel-supporting rolling bearing unit as described above, the inner member includes a hub ring having one raceway surface among the plural lines of raceway surfaces and an inner ring having other raceway surface. With regard to the hub ring and the inner ring, a cylindrical portion formed on an axial end portion of the hub ring is inserted through the inner ring, a die is pressed against a tip end portion of the cylindrical portion, which protrudes to an axial end portion side more than the inner ring, swing caulking is performed therefor, and an axial end surface of the inner ring is held by a caulked portion formed by caulking and expanding the tip end portion of the cylindrical portion radially outward. Hence, the hub ring and the inner ring are fixed integrally with each other to form the inner member. The swing caulking as described above can be performed by a swing forging machine (for example, as disclosed in Patent Literature 1).

CITATION LIST

Patent Literature

PTL 1: JP H08-47741 A

SUMMARY

Technical Problem

The conventional swing forging machine is, however, a large device with a high maximum machining load, and accordingly, there has been a case where cost of equipment is increased. Therefore, it is apprehended that there may occur a problem that production cost of the wheel-supporting rolling bearing unit is increased.

Accordingly, it is an object of the present invention to provide a method capable of solving such a problem as described above and capable of producing the wheel-supporting rolling bearing unit at low cost.

Solution to Problem

In order to address the above issues, according to one aspect of the present invention, there is provided a method for producing a wheel-supporting rolling bearing unit, which includes: an inner member having a first inner raceway surface and a second inner raceway surface on an outer circumferential surface of the inner member; an outer member having a first outer raceway surface opposite to the first inner raceway surface and a second outer raceway surface opposite to the second inner raceway surface and being disposed on an outside of the inner member; and rolling elements disposed between the first inner raceway surface and the first outer raceway surface, and between the second inner raceway surface and the second outer raceway surface so as to be capable of rolling, in which the inner member is configured such that a hub ring in which the first inner raceway surface is formed on the outer circumferential surface directly or via an inner raceway ring and an inner ring in which the second inner raceway surface is formed on the outer circumferential surface are fixed integrally with each other, the method including: inserting a cylindrical portion into the inner ring, the cylindrical portion being formed on an axial end portion of the hub ring; performing swing caulking by pressing a die against a tip end portion of the cylindrical portion protruding on an axial end side more than the inner ring; holding an axial end surface of the inner ring by a caulked portion formed by caulking and expanding the tip end portion of the cylindrical portion radially outward, and fixing the inner ring and the hub ring integrally with each other, wherein a swing angle of the swing caulking is set at 15 degrees or more to 30 degrees or less.

In the above-described method for producing the wheel-supporting rolling bearing unit, a swing rotation speed of the swing caulking may be set at 100 min$^{-1}$ or more to 299 min$^{-1}$ or less.

In addition, SKD11 steel prescribed in JIS G4404 may be used as a material of the die, and a lubricant may not be used in the swing caulking.

Further, the swing caulking may be performed by using a riveting machine in which a maximum machining load is 150 kN or less. The riveting machine may include: a spindle on which the die is mounted; and a motor that rotates the spindle, and the spindle and the motor are directly connected to each other. Then, rotation of the motor may be subjected to inverter control, and the inverter control may be vector control.

Moreover, in the above-described method for producing the wheel-supporting rolling bearing unit, the swing caulking may be performed so that surface roughness Ra of the caulked portion is 20 μm or less. In addition, the swing caulking may be performed so that an effective strain of the caulked portion is 0.015 strain or less.

Furthermore, in the above-described method for producing the wheel-supporting rolling bearing unit, the step of performing swing caulking may include: performing the swing caulking of at least two swing angles as a preliminary test; measuring surface roughness Ra of the caulked portion at each of the swing angles; applying the swing angles and pieces of the surface roughness Ra to a following Expression (1) that expresses a relationship between the swing angle α and the surface roughness Ra of the caulked portion; calculating constants A and C which satisfy the following Expression (1); calculating a swing angle at which the surface roughness Ra of the caulked portion becomes a predetermined value by using the following Expression (1) determined by the constants A and C; and performing the swing caulking for producing the wheel-supporting rolling bearing unit by using the calculated swing angle, Expression 1

$$Ra = A\sqrt{1 - \left(\frac{\sin\alpha - \varepsilon}{\sin\alpha}\right)^2} + C \qquad (1)$$

It is to be noted that ε in the Expression (1) is a ratio δ/r of a rolling reduction δ of the swing caulking to a radius r of the die.

Advantageous Effects

According to the method for producing the wheel-supporting rolling bearing unit, the wheel-supporting rolling bearing unit can be produced at low cost.

DESCRIPTION OF EMBODIMENTS

Figure 1:
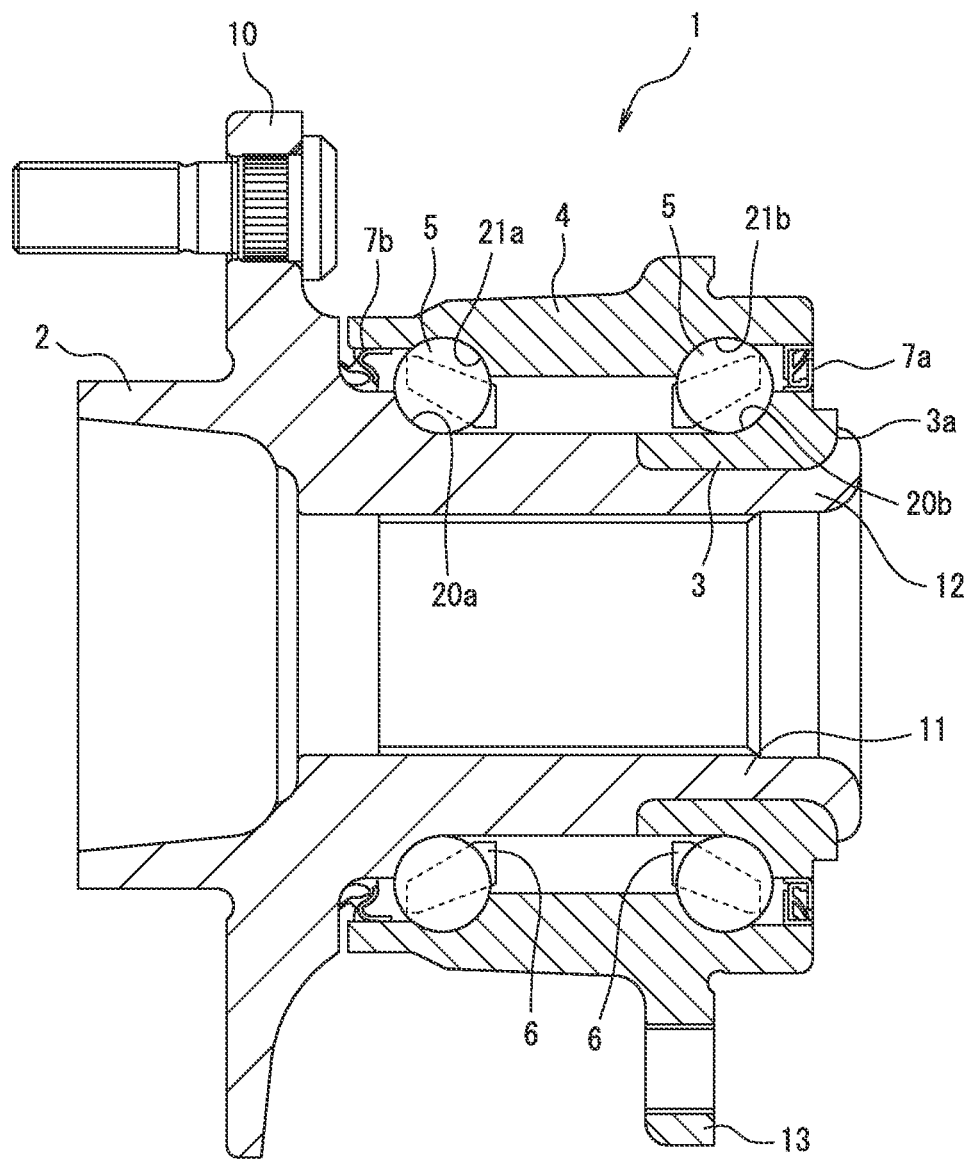
FIG. 1 is a cross-sectional view illustrative of a structure of a wheel-supporting rolling bearing unit.

A description will be given of an embodiment of the present invention while referring to the drawings. FIG. 1 is a cross-sectional view illustrative of a structure of a wheel-supporting rolling bearing unit. It is to be noted that, in this embodiment, in a state where the wheel-supporting rolling bearing unit is attached onto a vehicle such as an automobile, an outside in a width direction is referred to as an outer end side, and a center side in the width direction is referred to as an inner end side. That is to say, in FIG. 1, a left side thereof is the outer end side, and a right side thereof is the inner end side.

The wheel-supporting rolling bearing unit 1 of FIG. 1 includes: a substantially cylindrical hub ring 2; an inner ring 3 integrally fixed to the hub ring 2; a substantially cylindrical outer ring 4 disposed coaxially with outsides of the hub ring 2 and the inner ring 3; two lines of rolling elements 5; and cages 6 which hold the rolling elements 5. Moreover, between an inner circumferential surface of an inner end side portion of the outer ring 4 and an outer circumferential surface of an inner end side portion of the inner ring 3, and between an inner circumferential surface of an outer end side portion of the outer ring 4 and an outer circumferential surface of an axial intermediate portion of the hub ring 2, sealing devices 7a are provided, respectively.

Moreover, a wheel-attaching flange 10 for supporting a wheel (not illustrated) is provided in the hub ring 2 disposed in an inside of the outer ring 4, on an outer circumferential surface of an outer end side portion thereof protruding from the outer ring 4. Then, on an outer circumferential surface of the outer ring 4, on an end portion thereof on a side spaced from the wheel-attaching flange 10, a suspension device-attaching flange 13 is provided.

In the inner end side portion of the hub ring 2, a cylindrical portion 11 small in outer diameter is formed, and the cylindrical portion 11 is inserted through an inside of the inner ring 3, and the cylindrical portion 11 and the inner ring 3 are fitted to each other. Then, a tip end portion of the cylindrical portion 11, which protrudes to the inner end side more than the inner ring 3, is caulked and expanded radially outward. An axial end surface 3a (inner end-side end surface) of the inner ring 3 is held by a caulked portion 12 formed on the cylindrical portion 11 by plastic deformation caused by this caulking, so that the inner ring 3 and the hub ring 2 are fixed integrally with each other. It is to be noted that one formed by fixing the inner ring 3 and the hub ring 2 integrally with each other corresponds to an inner member as a component included in the present invention, and that the outer ring 4 corresponds to an outer member as a component in the present invention.

Raceway surfaces are individually formed on an axial intermediate portion of an outer circumferential surface of the hub ring 2 and an outer circumferential surface of the inner ring 3, the raceway surface of the hub ring 2 is defined as a first inner raceway surface 20a, and the raceway surface of the inner ring 3 is defined as a second inner raceway surface 20b. Moreover, on an inner circumferential surface of the outer ring 4, raceway surfaces opposite to both of the inner raceway surfaces 20a and 20b are formed, the raceway surface opposite to the first inner raceway surface 20a is defined as a first outer raceway surface 21a, and the raceway surface opposite to the second inner raceway surface 20b is defined as a second outer raceway surface 21b. Furthermore, the plural rolling elements 5 is disposed so as to be capable of rolling between the first inner raceway surface 20a and the first outer raceway surface 21a and between the second inner raceway surface 20b and the second outer raceway surface 21b.

In order to assemble the wheel-supporting rolling bearing unit 1 as described above to the vehicle such the automobile, the suspension device-attaching flange 13 is fixed to a suspension device (not illustrated), and the wheel (not illustrated) is fixed to the wheel-attaching flange 10. Then, the wheel is supported rotatably with respect to the suspension device by the wheel-supporting rolling bearing unit 1. That is to say, the one formed by fixing the inner ring 3 and the hub ring 2 integrally with each other becomes a rotating ring that rotates integrally with the wheel, and the outer ring 4 becomes a fixed ring (non-rotating ring) that supports the rotating ring (one formed by fixing the inner ring 3 and the hub ring 2 integrally with each other) rotatably via the rolling of the rolling elements 5.

It is to be noted that, though balls are used as the rolling elements in the illustrated example, skids may be used depending on the usage purpose or the like of the wheel-supporting rolling bearing unit 1.

Moreover, the present invention is applicable to a variety of such wheel-supporting rolling bearing units. For example, the present invention is also applicable to a so-called third-generation wheel-supporting rolling bearing unit (wheel-supporting rolling bearing unit in which the first inner raceway surface 20a is directly formed on the outer circumferential surface of the hub ring 2) like the wheel-supporting rolling bearing unit 1 in FIG. 1, and the present invention is also applicable to a wheel-supporting rolling bearing unit (wheel-supporting rolling bearing unit in which the first inner raceway surface is formed on the outer circumferential surface of the hub ring via an inner raceway ring member) of such a type as will be described below.

That is to say, the wheel-supporting rolling bearing unit as the latter one includes: a hub ring; a pair of inner rings fixed integrally with the hub ring; an outer ring disposed coaxially with outsides of the hub ring and the pair of inner rings; and two lines of rolling elements. The wheel-supporting rolling bearing unit may include cages configured to hold the rolling elements. Moreover, sealing devices may be individually provided between an inner circumferential surface of an inner end side portion of the outer ring and an outer circumferential surface of an inner end side portion of the inner end-side inner ring of the pair of inner rings, and between an inner circumferential surface of an outer end side portion of the outer ring and an outer circumferential surface of an axial intermediate portion of the hub ring.

In the hub ring disposed in an inside of the outer ring, wheel-attaching flange for supporting the wheel is provided on an outer circumferential surface of an outer end side portion thereof protruding from the outer ring. Then, a suspension device-attaching flange is provided on an outer circumferential surface of the outer ring, on an end portion thereof on a side spaced from the wheel-attaching flange.

A cylindrical portion small in outer diameter is formed in the inner end side portion of the hub ring. The cylindrical portion is inserted through insides of the pair of inner rings arrayed sided by side in the axial direction, and the cylindrical portion and the pair of inner rings are fitted to each other. Then, a tip end portion of the cylindrical portion, which protrudes to the inner end side more than the inner end-side inner ring of the pair of inner rings, is caulked and expanded radially outward, and, an axial end surface (inner end-side end surface of the inner ring) of the inner ring on the inner end side is held by a caulked portion formed on the cylindrical portion by plastic deformation caused by this caulking, so that a pair of the inner ring and the hub ring are fixed integrally with each other.

It is to be noted that one formed by fixing the pair of inner ring and hub ring integrally with each other corresponds to the inner member as a component included in the present invention, and that the outer ring corresponds to the outer member as a component included in the present invention. Moreover, the inner ring on the outer end side (that is, a base end side of the cylindrical portion) between the pair of inner rings corresponds to the inner raceway ring member as a component included in the present invention, and the inner ring on the inner end side (that is, a tip end side of the cylindrical portion) between the pair of inner rings corresponds to the inner ring as a component included in the present invention.

Raceway surfaces are individually formed on outer circumferential surfaces of the pair of inner rings, the raceway surface of the inner ring on the outer end side is defined as a first inner raceway surface, and the raceway surface of the inner ring on the inner end side is defined as a second inner raceway surface. Moreover, raceway surfaces opposite to both of the inner raceway surfaces are formed on an inner circumferential surface of the outer ring. The raceway surface opposite to the first inner raceway surface is defined as a first outer raceway surface, and the raceway surface opposite to the second inner raceway surface is defined as a second outer raceway surface. Furthermore, plural rolling elements is disposed so as to be capable of rolling between the first inner raceway surface and the first outer raceway surface and between the second inner raceway surface the second outer raceway surface.

In order to assemble the wheel-supporting rolling bearing unit as described above into the vehicle such the automobile, the suspension device-attaching flange is fixed to the suspension device (not illustrated), and the wheel (not illustrated) is fixed to the wheel-attaching flange. Then, the wheel is supported rotatably with respect to the suspension device by the wheel-supporting rolling bearing unit. That is to say, the one formed by fixing the pair of the inner ring and the hub ring integrally with each other becomes a rotating ring that rotates integrally with the wheel, and the outer ring becomes a fixed ring (non-rotating ring) that supports the rotating ring (one formed by fixing the pair of the inner ring and the hub ring integrally with each other) rotatably via the rolling of the rolling elements 5.

In a production process of this wheel-supporting rolling bearing unit 1, such integration of the inner ring 3 and the hub ring 2 is performed by the caulking as mentioned above. A description will be given of a method for producing the wheel-supporting rolling bearing unit 1.

The hub ring 2, the outer ring 4, the rolling elements 5, the cages 6 and the like are assembled as illustrated in FIG. 1. Thereafter, the inner ring 3 is fitted to the cylindrical portion 11 of the hub ring 2, so that a semi-finished product of the wheel-supporting rolling bearing unit 1 is formed. Then, this semi-finished product is mounted on a swing caulking device, and the swing caulking is performed.

Figure 2:
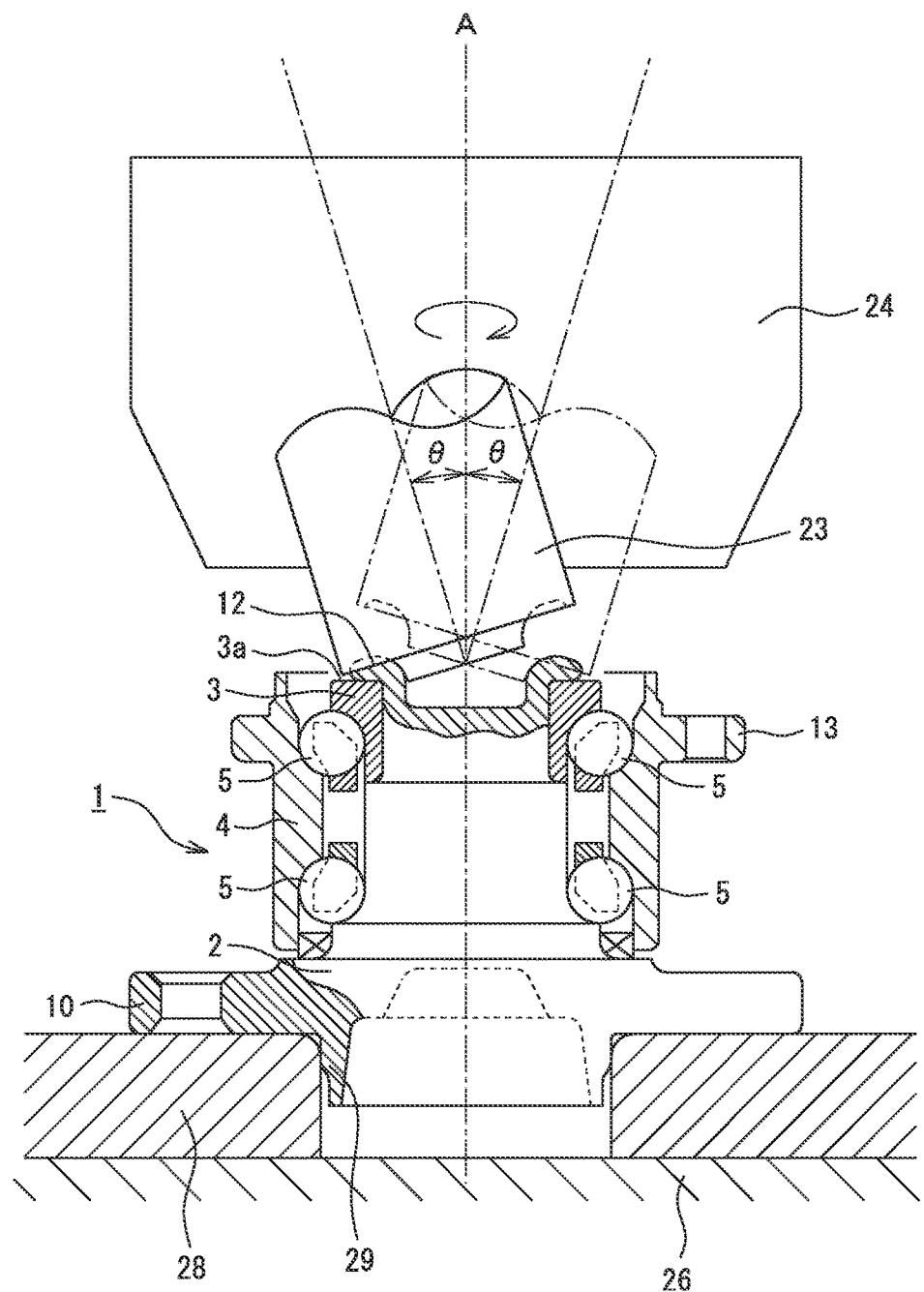
FIG. 2 is a cross-sectional view illustrative of a structure of a swing caulking device.

As illustrated in FIG. 2, the swing caulking device includes: a base 26 for fixing the semi-finished product; a die 23 configured to abut on the cylindrical portion 11 of the hub ring 2 and performs the swing caulking; and a spindle 24 configured to hold the die 23 on an upper end portion (head) thereof and rotates.

At a time of the swing caulking, the wheel-attaching flange 10 is mounted on a pedestal 28 provided on the base 26, and in addition, a protruding portion 29 formed on an outer end side portion of the semi-finished product is fitted into a hold portion formed in the pedestal 28, and is fitted to the base 26 while vertically setting a center axis line A of the semi-finished product. Further, a center position of the semi-finished product is set. If desired, the suspension device-attaching flange 13 may be further fixed to the base 26.

Figure 3:
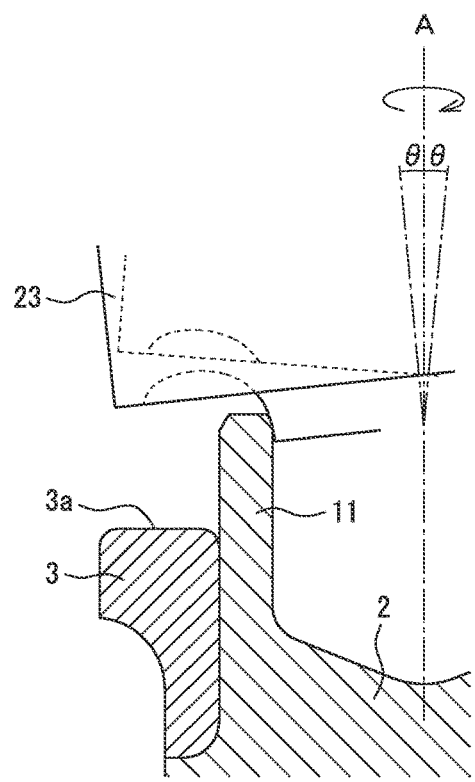
FIG. 3 is a principal portion enlarged view explaining a method of swing caulking.

Next, as illustrated in FIG. 3, with keeping a state where an axis of the die 23 is tilted by a predetermined angle θ with respect to the center axis line A of the semi-finished product, the die 23 is allowed to abut against an inner circumferential surface of a tip end portion of the cylindrical portion 11, and while pressing the die 23 downward in FIG. 3, the spindle 24 is rotated about the center axis line A of the semi-finished product, which is taken as a rotation center, and the die 23 is subjected to swing rotation. At this time, the above-described angle θ, that is, a swing angle of the swing caulking is set at 15 degrees or more to 30 degrees or less.

Figure 4:
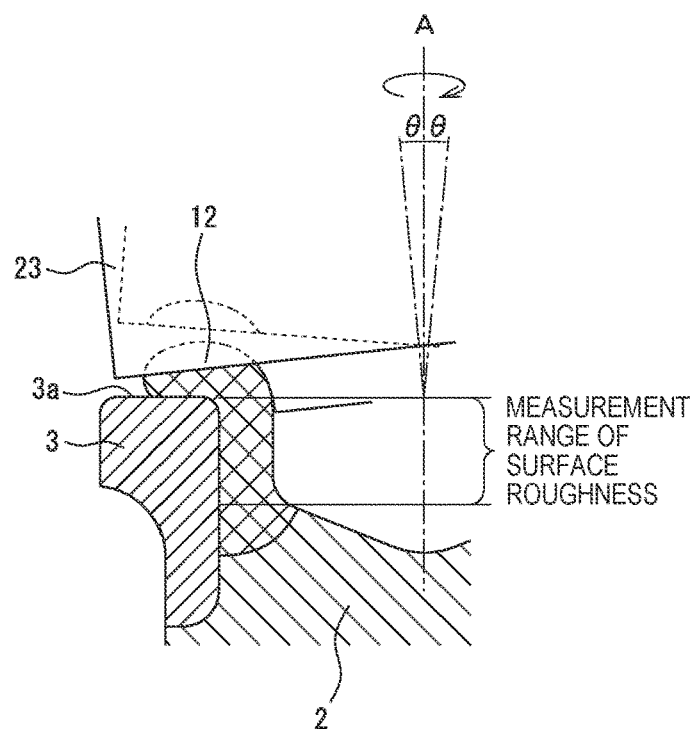
FIG. 4 is a principal portion enlarged view explaining the method of the swing caulking.

Then, as illustrated in FIG. 4, the tip end portion of the cylindrical portion 11, which protrudes to the inner end side more than the inner ring 3, is subjected to the plastic deformation, and is caulked and expanded radially outward. Then, the axial end surface 3a (inner end-side end surface) of the inner ring 3 is held by the caulked portion 12 formed by the plastic deformation caused by this swing caulking, so that such integral fixing of the hub ring 2 and the inner ring 3 and application of a preload, which is made thereto, are performed, and the wheel-supporting rolling bearing unit 1 as a finished product is obtained.

When the wheel-supporting rolling bearing unit 1 is produced by such a production method as described above, a maximum machining load of the swing caulking can be reduced since the swing angle of the swing caulking is 15 degrees or more to 30 degrees or less. As a result, the swing caulking can be performed by using the swing caulking device which is compact, and accordingly, cost of equipment can be saved, and the wheel-supporting rolling bearing unit 1 can be produced at low cost.

It is to be noted that the caulked portion 12 stands for a portion of the cylindrical portion 11, which is subjected to the plastic deformation by the swing caulking, and includes not only the tip end portion of the cylindrical portion 11, which is caulked and expanded radially outward and holds the axial end surface 3a of the inner ring 3, but also a base end portion of the cylindrical portion 11, which is located on a base end side more than the tip end portion and is in contact with the inner circumferential surface of the inner ring 3. This is because the base end portion is affected by the plastic deformation of the above-described tip end portion. That is to say, a portion hatched in a mesh pattern in FIG. 4 is a plastic region, and is the caulked portion 12.

Then, details will be described later with regard to a region of the caulked portion 12, which is illustrated in FIG. 4 (that is, the region is an outer circumferential surface of the base end portion of the cylindrical portion 11, which is located on the base end side more than the tip end portion of the cylindrical portion 11 and is in contact with the inner circumferential surface of the inner ring 3, the tip end portion being caulked and expanded radially outward and holding the axial end surface 3a of the inner ring 3), surface roughness Ra of the region concerned has a good correlation with durability.

Next, a description will be given of a variety of conditions of the swing caulking and critical significance of respective numeric values in the conditions.

Figure 5:
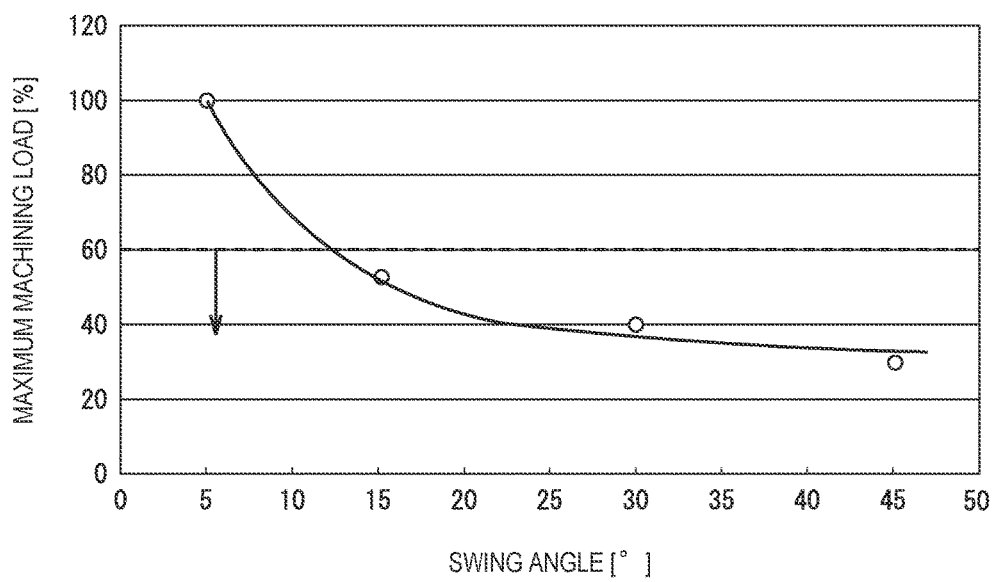
FIG. 5 is a graph illustrative of a relationship between a swing angle of the swing caulking and a maximum machining load thereof.

A. Regarding Swing Angle
A-1 Relationship Between Swing Angle and Cost of Equipment As illustrated in a graph of FIG. 5, as the swing angle is large, the maximum machining load of the swing caulking becomes lower, and as the swing angle is set at 15 degrees or more, the maximum machining load can be decreased to 60% or less in a case where the swing angle is 5 degrees. As a result, the swing caulking can be performed by using the swing caulking device which is compact. Accordingly, the cost of equipment can be saved, and the wheel-supporting rolling bearing unit 1 can be produced at low cost. It is to be noted that numeric values (maximum machining loads) on an axis of ordinates on the graph of FIG. 5 are relative values taken when a maximum machining load in the case where the swing angle is 5 degrees is defined as 100%.

However, in the conventional swing forging machine (for example, one disclosed in Patent Literature 1), the swing angle is 2 to 5 degrees. Accordingly, in a case of using the conventional swing forging machine as the above-described swing caulking device, it is necessary to modify the swing forging machine in order to enable such a swing angle of 15 degrees or more. However, in order to enable the swing angle of 15 degrees or more, an upper end portion (head) of the spindle mounted on the die is increased in size, accordingly, a balance of the whole of the device is deteriorated (that is, an upper portion of the device becomes larger than a lower portion thereof), and therefore, such modification as described above has not been easy. Moreover, a scale of the modification becomes large, and accordingly, the cost of equipment of the swing caulking device is increased, which has sometimes resulted in an increase of the production cost of the wheel-supporting rolling bearing unit.

Accordingly, in one embodiment, a riveting machine as the above-described swing caulking device can be used. When the swing caulking device is the riveting machine, then the swing angle of 15 degrees or more is enabled by small-scale modification, and accordingly, such a compact swing caulking device with a low maximum machining load can be obtained. Hence, if such a swing caulking device formed by modifying the riveting machine is used, then the cost of equipment can be saved, and accordingly, the wheel-supporting rolling bearing unit can be produced at low cost.

It is to be noted that, as modification contents of the riveting machine, for example, there are mentioned: a change of the die; a change of a setting angle of the die with respect to the spindle (for example, a change of an angle of a die-mounting hole, which is provided on the tip end portion of the spindle, with respect to the rotation center); a change of a bearing that supports the die on the tip end portion of the spindle; and the like.

A-2 Relationship Between Swing Angle and Durability of Caulked Portion

With regard to the portion subjected to the plastic deformation by the caulking, it is known that the durability thereof is higher as the surface roughness thereof is being smaller. Hence, in the wheel-supporting rolling bearing unit, the surface roughness of the caulked portion is important. In a model such as a Sport Utility Vehicle (SUV) and a luxury vehicle, in which requirements for the durability of the caulked portion are strict, the surface roughness of the caulked portion is particularly important.

Figure 6:
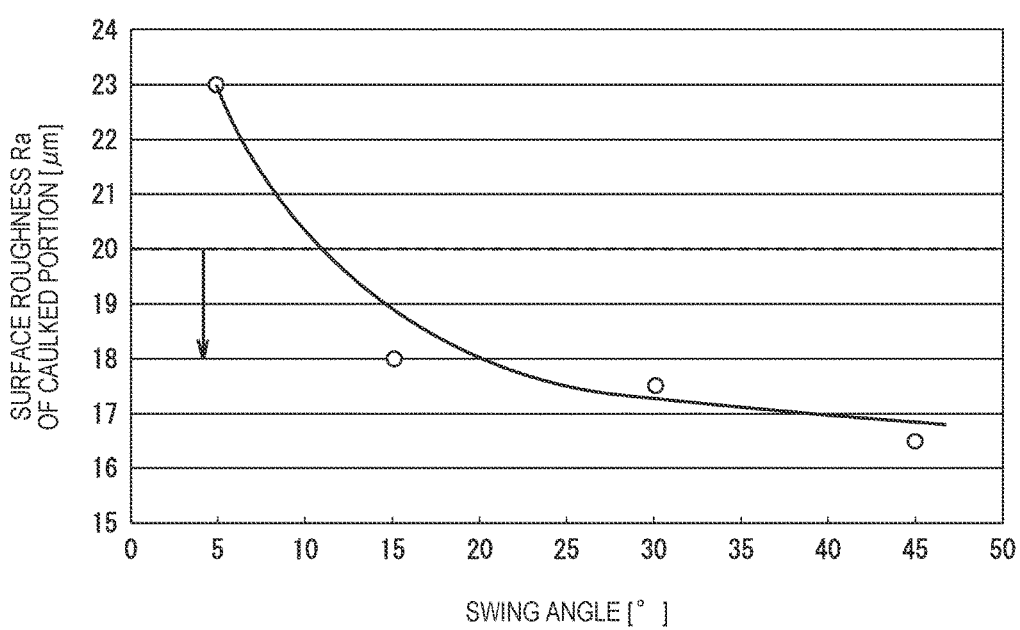
FIG. 6 is a graph illustrative of a relationship between a swing angle of the swing caulking and surface roughness of the caulked portion.

A graph of FIG. 6 illustrates a relationship between the swing angle and the surface roughness of the outer circumferential surface of the base end portion of the cylindrical portion, which is located on the base end side more than the tip end portion of the cylindrical portion and is in contact with the inner circumferential surface of the inner ring (that is, the outer circumferential surface is a region illustrated as a "measurement range of surface roughness" in FIG. 4) in the caulked portion. As seen from the graph of FIG. 6, when the swing angle is set at 15 degrees or more, the surface roughness Ra of the outer circumferential surface of the caulked portion can be reduced. Accordingly, the durability of the caulked portion can be enhanced. Hence, also in terms of the durability of the caulked portion, the swing angle can be set at 15 degrees or more in one embodiment.

Here, a description will be given in detail of a reason why the surface roughness of the caulked portion becomes smaller when the swing angle is increased. When the swing angle is increased, a contact area between the die and the tip end portion of the cylindrical portion of the hub ring is increased. Then, since an effective strain of the caulked portion decreases, the surface roughness of the caulked portion becomes smaller.

Figure 7A:
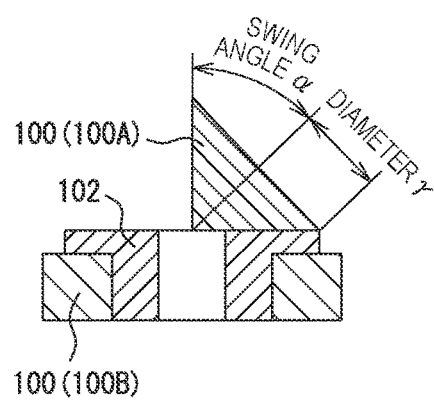
FIG. 7A and FIG. 7B are views schematically illustrative of a die and a hub ring.
Figure 7B:
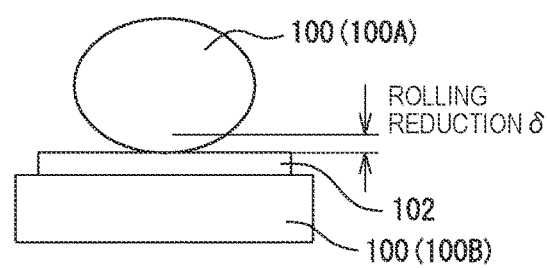

First, a description will be given of a relationship between the swing angle and the contact area. However, a shape of the die that caulks the cylindrical portion of the hub ring is complicated, and accordingly, a die 100 with a conic shape as illustrated in FIG. 7A and FIG. 7B is conceived in order to simplify a calculation. FIG. 7A is a cross-sectional view schematically illustrative of the die 100 (an upper die 100A and a lower die 100B) and the hub ring 102, and FIG. 7B is a side view schematically illustrative of the die 100 and the hub ring 102.

In an event of caulking the tip end portion of the cylindrical portion of the hub ring 102 by such a conic die 100 (upper die 100A), when a contact area between the die 100 (upper die 100A) and the tip end portion of the cylindrical portion at a rolling reduction δ is defined as S, then the contact area S is represented by a following Expression (2), in which the swing angle α is a variable, by geometrically approximating the same contact area S. Then, Expression (2), which is illustrated graphically, is a graph of FIG. 8. It is to be noted that A' and C' are constants, r is a radius of the conic die 100 (upper die 100A), and ε is δ/r.

Expression 2

$$S = A' \sqrt{1 - \left(\frac{\sin\alpha - \varepsilon}{\sin\alpha}\right)^2} + C' \qquad (2)$$

Figure 9:
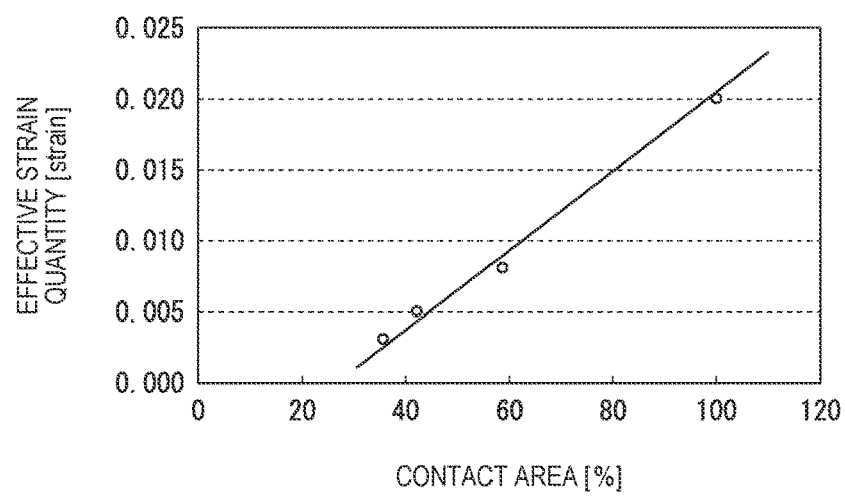
FIG. 9 is a graph illustrative of a relationship between the contact area between the die and the tip end portion of the cylindrical portion and an effective strain of the caulked portion.

Next, a description will be given of a relationship between the effective strain of the caulked portion and the contact area between the die 100 and the tip end portion of the cylindrical portion of the hub ring 102. For the caulked portion of the cylindrical portion of the hub ring 102, which is subjected to the swing caulking while setting the swing angle at 5 degrees, 15 degrees, 30 degrees or 45 degrees, an elastoplastic Finite Element Method (FEM) analysis was performed, and the effective strain of the caulked portion (specifically, the base end portion of the cylindrical portion, which is located on the base end side more than the tip end portion of the cylindrical portion and is in contact with the inner circumferential surface of the inner ring) was obtained. Results are illustrated in the graph of FIG. 9. It is to be noted that numeric values (contact areas) on an axis of abscissas on this graph are relative values taken when the contact area in a case where the swing angle is 5 degrees is defined as 100%.

Next, a description will be given of a relationship between the effective strain of the caulked portion and the surface roughness of the caulked portion. For the caulked portion of the cylindrical portion of the hub ring 102, which is subjected to the swing caulking while setting the swing angle at 5 degrees, 15 degrees, 30 degrees or 45 degrees (specifically, the caulked portion includes the outer circumferential surface of the base end portion of the cylindrical portion, which is located on the base end side more than the tip end portion of the cylindrical portion and is in contact with the inner circumferential surface of the inner ring), the surface roughness was measured. Then, the relationship between the effective strain of the caulked portion and the surface roughness of the caulked portion was illustrated graphically (refer to FIG. 10). It is to be noted that the surface roughness Ra of the cylindrical portion of the hub ring 102 before the swing caulking is 7 μm to 8 μm.

Figure 8:
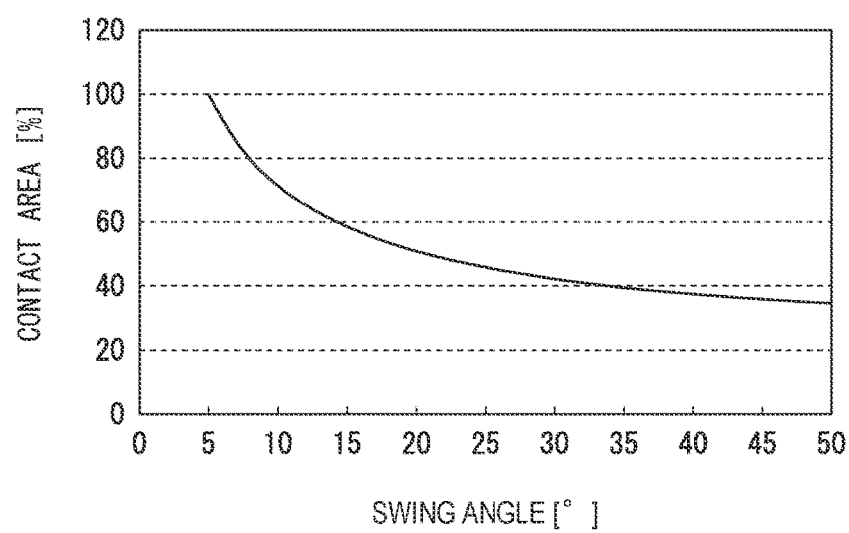
FIG. 8 is a graph illustrative of a relationship between the swing angle of the swing caulking and a contact area between the die and a tip end portion of a cylindrical portion.

When the graph of FIG. 8 and the graph of FIG. 6 are compared with each other, it is seen that shapes of the graphs are similar to each other. A reason for this will be described below.

Figure 10:
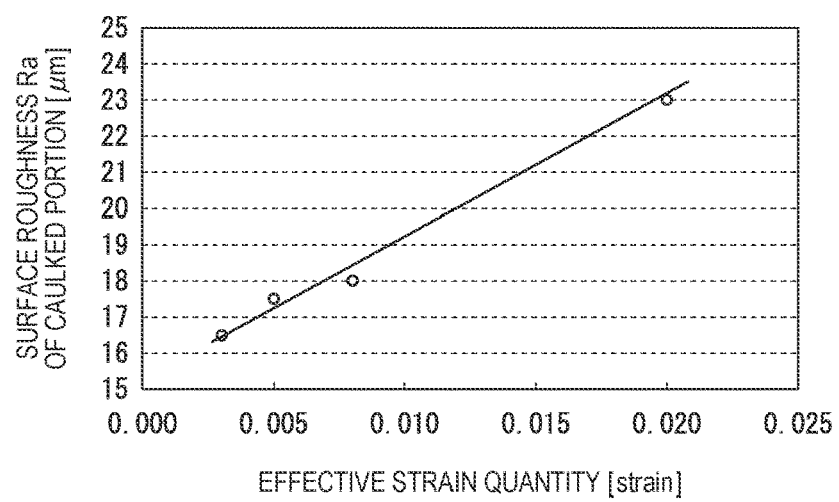
FIG. 10 is a graph illustrative of a relationship between the effective strain of the caulked portion and the surface roughness thereof.

First, the shapes of the graphs of FIGS. 8 to 10 are represented as functions. When the function of the contact area S is S(α) while defining the swing angle as α, the function that represents the graph of FIG. 8 becomes x=S(α). The graphs of FIGS. 9 and 10 are linear lines. Therefore, the function that represents the graph of FIG. 9 becomes y=B·x+D (B and D are constants), and the function that represents the graph of FIG. 10 becomes z=y+F (E and F are constants).

The graph of FIG. 6 can be approximated by a function obtained by synthesizing the graphs of FIGS. 8 to 10 with one another. First, when the graph of FIG. 8 and the graph of FIG. 9 are synthesized with each other, y=B·S(α)+D is established. Moreover, then the graph of FIG. 10 is synthesized with this resultant, the graph of FIG. 6 becomes z=E·(B·S(α)+D)+F=E·B·S(α)+E·D+F.

Incidentally, the matter that the shapes of the graphs are similar to each other means that the ways of the changes thereof are the same. The constants only move the graphs in parallel and change scales of the axes, and are not concerned with the changes. Hence, when only functions concerned with the changes are made except for E·B, E·D and F which are the constants, the function concerned with the change of the graph of FIG. 6 satisfies z'=S(α), and becomes the same as the function of the graph of FIG. 8. Therefore, it can be explained that the shape of the graph of FIG. 6 and the shape of the graph of FIG. 8 are similar to each other.

It is explained that the shape of the graph of FIG. 5 and the shape of the graph of FIG. 8 are similar to each other in a similar way. The function of the maximum machining load of FIG. 5 can be approximated by a product of the above-described contact area and a yield stress. When the yield stress is defined as Y, the graph of FIG. 5 is w=Y·S (α). Since materials in the graph of FIG. 5 and the graph of FIG. 8 are identical, the yield stress Y becomes a constant. When only functions concerned with the changes are taken out, the function concerned with the change of the graph of FIG. 5 satisfies w'=S(α), and becomes the same as the function of the graph of FIG. 8. Therefore, it can be explained that the shape of the graph of FIG. 5 and the shapes of the graphs of FIG. 6 and FIG. 8 are similar to each other.

Now, S(α) means the above-described Expression (2). Expression (2) is an approximate expression calculated by simplifying the die, which has an actually complicated shape, into the conic shape; however, satisfactorily coincides with experiment results by the die having the actually complicated shape. Hence, Expression (2) is usable as a design tool for estimating the surface roughness of the caulked portion and determining the swing angle.

The effective strain is used in a case of evaluating the durability by the analysis in an event of designing the caulked portion. The effective strain of the caulked portion can be set at 0.015 strain or less based on the graph of FIG. 10, in one embodiment.

Here, a description will be given of a method for estimating the surface roughness of the caulked portion and determining the swing angle in the swing caulking. First, as a preliminary test, swing caulking similar to the above-mentioned one is performed. In the preliminary test, the swing caulking is performed at at least two swing angles, and surface roughness Ra of each of caulked portions thus formed is measured. As the swing angles, arbitrary values can be selected. Moreover, each of measurements spots of the surface roughness is the region illustrated as the "measurement range of surface roughness" in FIG. 4.

The relationship between the swing angle α and the surface roughness Ra of the caulked portion is represented by the above-described Expression (1). Therefore, data of the swing angle and the surface roughness Ra, which are obtained by the preliminary, are applied to Expression (1), and for example, a least-squares method is used, so that the constants A and C, by which Expression (1) is established, are calculated. When Expression (1) in which the constants A and C are determined is used, then a range of the swing angle, which allows the surface roughness Ra of the caulked portion to become a desired value or less, can be calculated.

Hence, when the swing caulking for producing the wheel-supporting rolling bearing unit is performed at the swing angle thus calculated, then a wheel-supporting rolling bearing unit, which has good surface roughness on the caulked portion and is excellent in durability, can be produced.

A-3 Relationship Between Swing Angle and Abrasion

Figure 11:
FIG. 11 is a graph illustrative of a relationship between the swing angle of the swing caulking and an abrasion loss of the caulked portion.

From a graph of FIG. 11, it is seen that an abrasion loss of the caulked portion is significantly increased when the swing angle exceeds 30 degrees. Therefore, when the durability of the caulked portion is taken into consideration, suppress the abrasion by setting the swing angle at 30 degrees or less can be suppressed. Hence, the swing angle can be 15 degrees or more to 30 degrees or less, in one embodiment. It is to be noted that numeric values (abrasion losses) on an axis of ordinates on the graph of FIG. 11 are relative values taken when an abrasion loss in the case where the swing angle is 5 degrees is defined as 100%.

Moreover, when the relationship (refer to the graph of FIG. 5) between the swing angle and the maximum machining load, which is illustrated in the above-described Item A-1, the relationship (refer to the graph of FIG. 6) between the swing angle and the surface roughness of the caulked portion, which is illustrated in the above-described Item A-2, and the relationship (refer to the graph of FIG. 11) between the swing angle and the abrasion, which is illustrated in the above-described Item A-3, are synthesized with one another, then it can be said that the swing angle can be 15 degrees or more to 30 degrees or less in one embodiment, and can be 18 degrees or more to 27 degrees or less, in one embodiment.

B. Regarding Swing Rotation Speed

When the swing forging machine and the riveting machine are compared with each other, the die of the riveting machine, which is to be used, is smaller. Hence, a mass of the die of the riveting machine is smaller. Cost of the die is reduced as the mass is being smaller, but a heat capacity also becomes smaller by an amount that the mass is smaller. Therefore, it is apprehended that a lifetime of the die may be shortened by welding due to heat.

Since the heat is increased when a swing rotation speed is increased, it is necessary to take countermeasures against the heat of the die in response to the swing rotation speed of the swing caulking. Accordingly, in a variety of such swing rotation speeds, materials and lubrication conditions of the die, which satisfy the lifetime of the die, were investigated, and the cost of the die was evaluated. Results are indicated in Table 1. It is to be noted that the swing rotation speed means an orbital speed when a rotation axis of the die, which is tilted by a predetermined swing angle, is revolved around an orbital axis (rotation axis of the swing caulking device).

TABLE 1

| Swing rotation speed ($min^{-1}$) | Material of die | TiCN coating | Lubrication | Cost of die |
|---|---|---|---|---|
| 100 to 299 | SKD11 | none | No | o |
| 300 to 500 | SKH51 | none | No | Δ |
| 501 to 750 | SKH51 | present | No | x |
| 751 to 1000 | cemented carbide | none | Yes | x |

As seen from Table 1, when the swing rotation speed is 751 $min^{-1}$ to 1000 $min^{-1}$, it is necessary to use cemented carbide as the material of the die, and it is necessary to lubricate the die and the hub ring by using a lubricant in the swing caulking. Hence, the cost of the die is increased (this is indicated by a mark "x" in Table 1).

Moreover, when the swing rotation speed is 501 to 750 $min^{-1}$, it is necessary to use SKH51, which is prescribed in JIS G4403, as the material of the die, and it is necessary to implement surface treatment of coating titanium carbonitride or the like for the die. The surface treatment is required though the lubrication by the lubricant is not required, and accordingly, the cost of the die is increased (this is indicated by a mark "x" in Table 1).

Moreover, when the swing rotation speed is 300 to 500 $min^{-1}$, it is necessary to use SKH51, which is prescribed in JIS G4403, as the material of the die. It is necessary to use SKH51 though the surface treatment of the die and the lubrication thereof by the lubricant are not required, and accordingly, the cost of the die is increased a little (this is indicated by a mark "Δ" in Table 1).

Furthermore, when the swing rotation speed is 100 to 299 $min^{-1}$, SKD11, which is prescribed in JIS G4404, can be used as the material of the die. Moreover, the surface treatment of the die and the lubrication thereof by the lubricant are not required. Hence, the cost of the die is reduced (this is indicated by a mark "o" in Table 1).

In accordance with these results, when the swing rotation speed is set at 100 $min^{-1}$ or more to 299 $min^{-1}$ or less, SKD11 is used as the material of the die (without the surface treatment), and no lubrication by the lubricant is performed, then the cost of the swing caulking can be decreased.

Moreover, in accordance with the results illustrated in Item A and Item B, which are described above, when the swing angle is set at 15 degrees or more to 30 degrees or less, and the swing rotation speed is set at 100 $min^{-1}$ or more to 299 $min^{-1}$ or less, then the swing caulking can be performed at low cost, and in addition, the durability of the caulked portion can be enhanced.

C. Regarding Comparison Between Riveting Machine and Swing Forging Machine

A description will be given of a case of using the riveting machine as the swing caulking device and a case of using the swing forging machine as the swing caulking device while making a comparison therebetween.

C-1 Stability of Swing Rotation

The conventional swing forging machine includes a speed reducer between the spindle, on which the die is mounted, and a motor, which rotates the spindle, and accordingly, there is little worry that torque may become insufficient even if the swing rotation speed is decreased (for example, to 100 $min^{-1}$ or more to 299 $min^{-1}$ or less).

Figure 12:
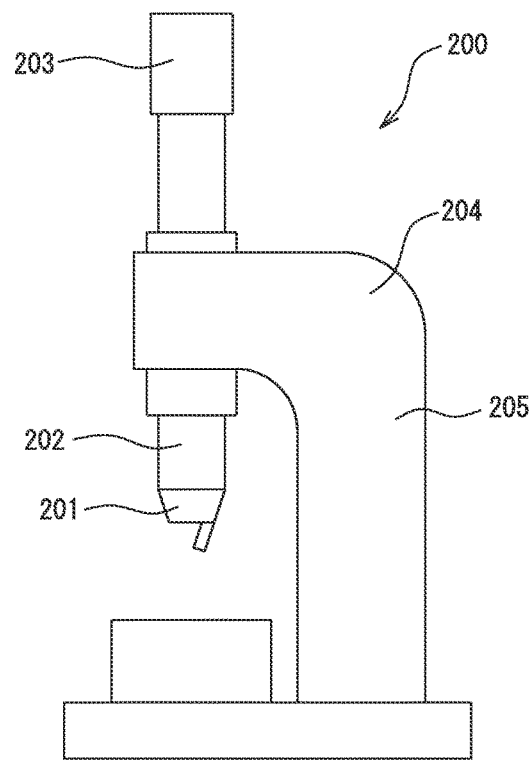
FIG. 12 is a view illustrative of a structure of a riveting machine.

In contrast, a riveting machine 200 (refer to FIG. 12) does not include the speed reducer between a spindle 202, on which a die 201 is mounted, and a motor 203, which rotates the spindle 202, and the spindle 202 and the motor 203 are directly connected to each other. Therefore, when the swing rotation speed is decreased, for example, to 100 min$^{-1}$ or more to 299 min$^{-1}$ or less, there is an apprehension that the swing rotation speed may be affected by inverter control in a case where rotation of the motor 203 is subjected to the inverter control.

The inverter control includes V/F control and vector control, and in a case of the V/F control, there is an apprehension that the swing rotation speed may become unstable since torque becomes insufficient. Accordingly, the vector control can be performed as the inverter control in the riveting machine. Then, the torque can be prevented from becoming insufficient by monitoring the torque and the swing rotation speed. The cost of equipment is higher in the speed reducer than in the inverter control, and accordingly, the cost of equipment of the swing caulking device is not increased even if the inverter control is performed without using the speed reducer.

C-2 Easiness of Set Switching

Usually, a frame shape of the swing forging machine is box frame-like (refer to Patent Literature 1), and accordingly, in an event of replacing the die, a pillar extended in an up-and-down direction in such a frame is located between the die and an operator in charge of this replacement, and a replacement operation is obstructed by the pillar. Moreover, a mass of the die is large. Hence, operability in replacing the die (that is, in set switching) is low. Moreover, the swing forging machine has a structure of fixing the die on a spherical seat by bolts, and accordingly, it takes a time to replace the die.

In contrast, with regard to the riveting machine 200, a shape of a frame 204 thereof is usually a substantial C-shape. Therefore, in the event of replacing the die 201, a pillar 205 of the frame 204, which is extended in the up-and-down direction, is located in the rear (right in FIG. 12) of the die 201 when viewed from such a replacement operator, and accordingly, the operation is not obstructed by the pillar 205. Moreover, a mass of the die 201 is also small. Hence, the operability in replacing the die (that is, in the set switching) is good. Furthermore, the riveting machine 200 has a structure of supporting the die 201 by a bearing (not illustrated) and suspending the die 201 from above, and accordingly, the die 201 can be replaced only by one action, and accordingly, it does not take long to replace the die.

C-3 Cost of Equipment

As commercial products of the conventional swing forging machine, those in each of which the maximum machining load is 200 kN or more are many. Hence, in order to miniaturize the swing caulking device, it is necessary to implement large-scale modification for the swing forging machine, or to develop new equipment. Therefore, it is difficult to reduce the cost of equipment.

In contrast, as the riveting machine, those in each of which the maximum machining load is 150 kN or less are many. Hence, modification for miniaturizing the swing caulking device is hardly necessary, and it is easy to reduce the cost of equipment.

REFERENCE SIGNS LIST 1 wheel-supporting rolling bearing unit
2 hub ring
3 inner ring
3a axial end surface
4 outer ring
5 rolling element
10 wheel-attaching flange
11 cylindrical portion
12 caulked portion
13 suspension device-attaching flange
20a first inner raceway surface
20b second inner raceway surface
21a first outer raceway surface
21b second outer raceway surface
23 die
24 spindle
100 die
102 hub ring
200 riveting machine
201 die
202 spindle
203 motor

The invention claimed is:

1. A method for producing a wheel-supporting rolling bearing unit, which includes: an inner member having a first inner raceway surface and a second inner raceway surface on an outer circumferential surface of the inner member; an outer member having a first outer raceway surface opposite to the first inner raceway surface and a second outer raceway surface opposite to the second inner raceway surface and being disposed on an outside of the inner member; and rolling elements disposed between the first inner raceway surface and the first outer raceway surface, and between the second inner raceway surface and the second outer raceway surface so as to be capable of rolling, in which the inner member is configured such that a hub ring in which the first inner raceway surface is formed on the outer circumferential surface directly or via an inner raceway ring and an inner ring in which the second inner raceway surface is formed on the outer circumferential surface are fixed integrally with each other, the method comprising:
  inserting a cylindrical portion into the inner ring, the cylindrical portion being formed on an axial end portion of the hub ring;
  performing a swing caulking by pressing a die against a tip end portion of the cylindrical portion protruding on an axial end side more than the inner ring;
  holding an axial end surface of the inner ring by a caulked portion formed by the swing caulking and expanding the tip end portion of the cylindrical portion radially outward, and
  fixing the inner ring and the hub ring integrally with each other,
  wherein a swing angle of the swing caulking is set at 15 degrees or more to 30 degrees or less, and
  wherein the swing caulking is performed so that a surface roughness (Ra) of a circumferential surface of a base end portion of the cylindrical portion, located on a base end side more than the tip end portion and in contact with the inner circumferential surface of the inner ring, of the caulked portion is 20 pm or less.

2. The method for producing the wheel-supporting rolling bearing unit according to claim 1, wherein the swing caulking is performed by using a riveting machine in which a maximum machining load is 150 kN or less.

3. The method for producing the wheel-supporting rolling bearing unit according to claim 2, wherein the riveting machine includes: a spindle on which the die is mounted; and a motor that rotates the spindle, and the spindle and the motor are directly connected to each other.

4. The method for producing the wheel-supporting rolling bearing unit according to claim 3, wherein rotation of the motor is subjected to an inverter control, and the inverter control is a vector control.

5. The method for producing the wheel-supporting rolling bearing unit according to claim 1, wherein a swing rotation speed of the swing caulking is set at 100 min$^{-1}$ or more to 299 min$^{-1}$ or less.

6. The method for producing the wheel-supporting rolling bearing unit according to claim 1, wherein SKD11 steel prescribed in JIS G4404 is used as a material of the die, and a lubricant is not used in the swing caulking.

7. The method for producing the wheel-supporting rolling bearing unit according to claim 1, wherein the swing caulking is performed so that an effective strain of the caulked portion is 0.015 strain or less.

8. A method for producing the wheel-supporting rolling bearing unit, which includes: an inner member having a first inner raceway surface and a second inner raceway surface on an outer circumferential surface of the inner member; an outer member having a first outer raceway surface opposite to the first inner raceway surface and a second outer raceway surface opposite to the second inner raceway surface and being disposed on an outside of the inner member; and rolling elements disposed between the first inner raceway surface and the first outer raceway surface, and between the second inner raceway surface and the second outer raceway surface so as to be capable of rolling, in which the inner member is configured such that a hub ring in which the first inner raceway surface is formed on the outer circumferential surface directly or via an inner raceway ring and an inner ring in which the second inner raceway surface is formed on the outer circumferential surface are fixed integrally with each other, the method comprising:

inserting a cylindrical portion into the inner ring, the cylindrical portion being formed on an axial end portion of the hub ring;

performing a swing caulking step by pressing a die against a tip end portion of the cylindrical portion protruding on an axial end side more than the inner ring:

holding an axial end surface of the inner ring by a caulked portion formed by the swing caulking step and expanding the tip end portion of the cylindrical portion radially outward, and fixing the inner ring and the hub ring integrally with each other, wherein a swing angle of the swing caulking step is set at 15 degrees or more to 30 degrees or less, and the performing the swing caulking step includes:

performing a swing caulking at at least two swing angles as a preliminary test;

measuring a surface roughness (Ra) of the caulked portion at each of the at least two swing angles;

applying the at least two swing angles and the surface roughness (Ra) of the caulked portion at each of the at least two swing angles to a following Expression (1) that expresses a relationship between the swing angle ($\alpha$) and the surface roughness (Ra) of the caulked portion;

calculating constants A and C, which satisfy the following Expression (1);

calculating a swing angle at which a surface roughness (Ra) of the caulked portion becomes a predetermined value by using the following Expression (1) with the determined constants A and C; and performing the swing caulking step for producing the wheel-supporting rolling bearing unit by using the calculated swing angle, Expression 1

$$Ra = A\sqrt{1 - \left(\frac{\sin\alpha - \varepsilon}{\sin\alpha}\right)^2} + C \quad (1)$$

where ($\varepsilon$) in the Expression (1) is a ratio ($\delta/r$) of a rolling reduction ($\delta$) of the swing caulking to a radius (r) of the die.

9. The method for producing the wheel-supporting rolling bearing unit according to claim 8, wherein the swing caulking step is performed by using a riveting machine in which a maximum machining load is 150 kN or less.

10. The method for producing the wheel-supporting rolling bearing unit according to claim 9, wherein the riveting machine includes: a spindle on which the die is mounted; and a motor that rotates the spindle, and the spindle and the motor are directly connected to each other.

11. The method for producing the wheel-supporting rolling bearing unit according to claim 10, wherein rotation of the motor is subjected to an inverter control, and the inverter control is a vector control.

12. The method for producing the wheel-supporting rolling bearing unit according to claim 8, wherein a swing rotation speed of the swing caulking step is set at 100 min$^{-1}$ or more to 299 min$^{-1}$ or less.

13. The method for producing the wheel-supporting rolling bearing unit according to claim 8, wherein SKD11 steel prescribed in JIS G4404 is used as a material of the die, and a lubricant is not used in the swing caulking step.

14. The method for producing the wheel-supporting rolling bearing unit according to claim 8, wherein the swing caulking step is performed so that the surface roughness (Ra) of the caulked portion is 20 pm or less.

15. The method for producing the wheel-supporting rolling bearing unit according to claim 8, wherein the swing caulking step is performed so that an effective strain of the caulked portion is 0.015 strain or less.

\* \* \* \* \*